United States Patent

[11] 3,586,977

[72] Inventors Harvey V. Lustig
2234 National Drive, Brooklyn, N.Y. 11234;
Ira Klein, 1439 52nd St., Brooklyn, N.Y. 11219; Donald G. Lamb, 2633 Ocean Ave., Brooklyn, N.Y. 11229

[21] Appl. No. 788,453
[22] Filed Jan. 2, 1969
[45] Patented June 22, 1971

[54] COMMUNICATION SYSTEM FOR HELMETED MOTORCYCLE RIDERS
2 Claims, 6 Drawing Figs.

[52] U.S. Cl. .......... 325/16, 179/1, 179/156, 325/16, 325/18, 325/21, 325/111, 325/312
[51] Int. Cl. .......... H04b 1/38
[50] Field of Search .......... 325/312, 16, 18, 21, 111; 179/1 VE, 1 SW, 156, 157

[56] References Cited
UNITED STATES PATENTS
2,766,378 10/1956 Sundin et al. .......... 179/1 SW
FOREIGN PATENTS
956,857 1/1957 Germany .......... 179/156

*Primary Examiner*—Robert L. Griffin
*Assistant Examiner*—Albert J. Mayer
*Attorney*—Polachek and Saulsbury

ABSTRACT: The disclosure describes a system providing voice intercommunication between a motorcycle rider and a passenger when both are wearing motorcycle helmets. The system employs a transistor radio with switching means to enable it to be used selectively for intercommunication purposes and for receiving radio broadcasts.

INVENTORS
HARVEY V. LUSTIG
IRA KLEIN
DONALD G. LAMB

BY Polachek & Saulsbury
ATTORNEYS

INVENTORS
HARVEY V. LUSTIG
IRA KLEIN
DONALD G. LAMB
BY
Polachek & Saulsbury
ATTORNEYS

COMMUNICATION SYSTEM FOR HELMETED MOTORCYCLE RIDERS

The present invention relates generally to intercommunication systems, and more particularly concerns voice intercommunication systems adapted for use by and between the driver of a motorcycle and a passenger on the motorcycle.

Heretofore the situation has existed in which voice communication between two riders on a motorcycle is almost impossible while the motorcycle is in operation. Where a driver and passenger both wear helmets, they can scarcely hear each other even when shouting due to the noise of the motorcycle engine, wind noise, surrounding traffic, etc.

The present invention is directed at solving this troublesome problem by providing an intercommunication system which makes use of a transistor radio as part of the system. The driver and passenger of the motorcycle wear helmets outfitted with speakers or earphones and throat microphones. Quick disconnect cables and connectors permit instant connection of the microphones and earphones to a transistor radio receiver carried by the driver. Switching means at the radio receiver permits it to be used to pass broadcast programs to the rider and passenger, or in the alternative to permit direct voice intercommunication between the driver and passenger via the audio amplifier output stage of the radio receiver.

Various objects, features and advantages of the invention will become apparent upon reading the following specification together with the drawing forming a part thereof.

Referring to the drawing.

Figures 1, 3, 4, 5:
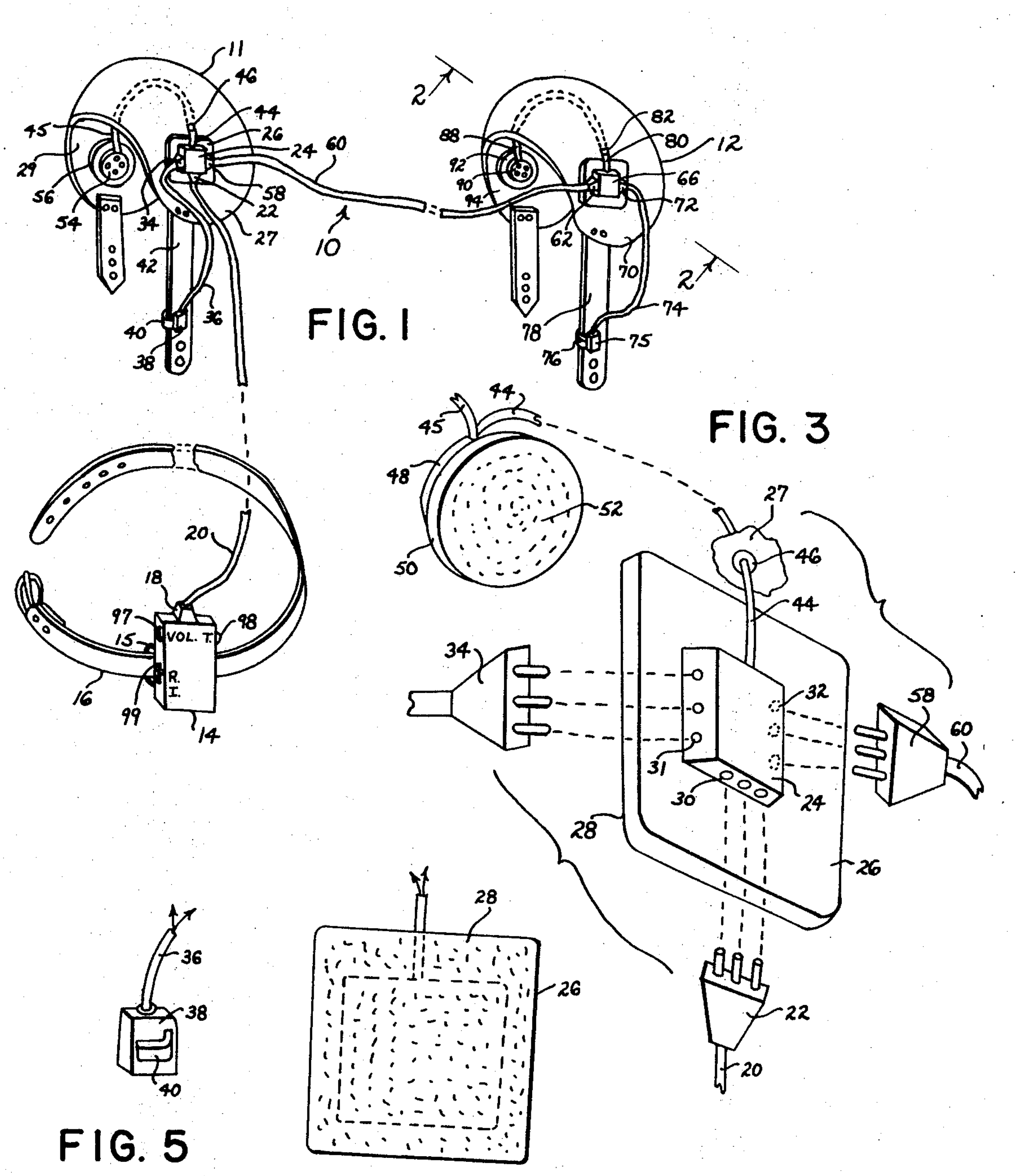
FIG. 1 is a perspective view of parts of a communication system embodying the invention.
FIG. 3 is an enlarged exploded perspective view of parts of the system.
FIG. 4 is a rear view of a junction box and pad employed in the system.
FIG. 5 is an enlarged perspective view of a throat microphone employed in the system.
Figure 2:
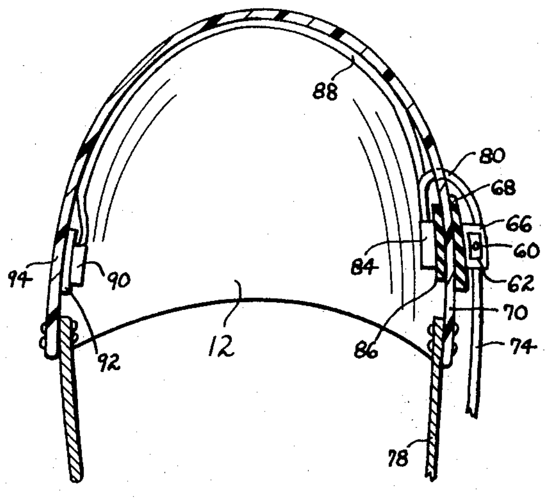
FIG. 2 is an enlarged sectional view taken on line 2–2 of FIG. 1.

Referring to the drawing there is shown in FIGS. 1 and 2 a communications system 10 associated with helmets 11 and 12 such as generally worn by motorcycle riders. Helmet 11 will be worn by the driver and helmet 12 will be worn by a passenger on a motorcycle. The communications system includes a transistorized radio receiver 14 of conventional type, modified as explained below for purposes of the system. The receiver is provided with a buckle 15 by means of which it is mounted on a strap 16. The strap is intended to be worn around the waist of the driver of the motorcycle.

Connected to the receiver by a detachable plug 18 is a cable 20. This cable terminates in another plug 22 detachably connected to a junction box 24 mounted on a resilient pad 26. Pad 26 is provided with a pressure sensitive adhesive layer 28 by means of which the pad and junction box are mounted on one sidewall 27 of helmet 11. The junction box has three sockets 30, 31 and 32 each at a different end wall (see FIG. 3). Plug 22 is connected to socket 30. Another plug 34 connected to socket 31 is connected at one end of a cable 36. The other end of the cable terminates at a throat microphone 38 having a leaf spring 40 by means of which the microphone is detachable secured to chin strap 42 of the helmet (see FIGS. 1 and 5). A cable 44 extends out of the upper end wall of the junction box and enters the side of the helmet through eyelet 46. Cable 44 terminates at a speaker on earphone 48 mounted on a resilient pad 50 secured to the inside of the helmet by a pressure sensitive adhesive 52. Cable 44 has a branch extension 45. Earphone 48 is located at the inside of wall 27 adjacent to the junction box 24. Another earphone or speaker 54 is mounted on the innerside of the opposite wall 29 of the helmet and is connected to earphone 48 by cable 45 cemented to the inside of the helmet. Earphone 54 is secured to a resilient pad 56 adhering to wall 29. If desired, the junction box and earphone pads can all be permanently secured by a suitable cement such as epoxy, however, it is preferred that the junction box and pads be all detachably mounted in the helmet by means of pressure sensitive adhesive.

A third plug 58 is engaged in socket 32. This plug is located at one end of a long cable 60. The other end of the cable terminates in a plug 62 plugged into a socket at one end wall of another junction box 66 secured to a pad 68 adhering to side wall 70 of helmet 12. Plug 72 at one end of a cable 74 is engaged in another socket at another end wall of junction box 66. Cable 74 terminates in a throat microphone 75 detachably mounted by a spring clip 76 on chin strap 78 of helmet 12. Cable 80 extends from junction box 66 through eyelet 82 in sidewall 70 of the helmet and terminates at an earphone or speaker 84 mounted on a resilient pad 86 adhering to the innerside of wall 70. A cable 88 which is a branch of cable 80 extends from earphone 84 to another earphone or speaker 90 mounted on a pad 92 adhering to the innerside of wall 94 of the helmet. Cable 88 is cemented to the inside of the helmet. Both cables 53 and 88 preferably extend along the underside of the tops or crowns of the helmet.

Figure 6:
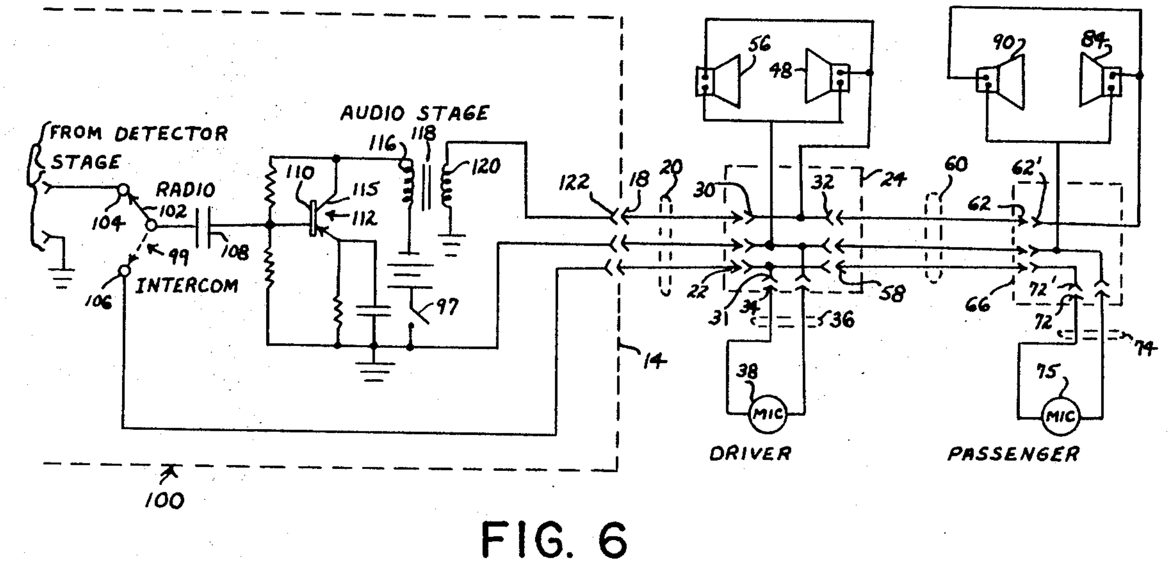
FIG. 6 is a diagram of the electric circuit of the system.

The electric circuitry of the system includes radio receiver 14 as above mentioned and shown in FIG. 1. This receiver, in addition to the usual on-off switch and volume control 97 and tuning control 98, has a two-position switch 99 which serves to switch operation of the system between radio broadcast reception and audio intercommunication as will now be explained in connection with circuit 100 in FIG. 6 to which reference is now made.

In circuit 100, only the audio output stage of the radio receiver 14 is shown. It will be understood that all preceding stages including radio frequency, intermediate frequency and detector stages are conventional. Switch 99 is a single pole-double throw switch. It is connected between the detector and audio stages. This switch has a single pole 102 selectively thrown to terminals 104 and 106. Signals received at terminal 104 from the detector stage are applied via input capacitor 108 to the base 110 of transistor amplifier 112. The amplified output current of the amplifier appears at the collector 115 and flows through primary 116 of the audio output transformer 118. The transformer secondary 120 is connected to socket 122 into which plug 20 is inserted. The audio signals are fed to all earphones or speakers 48, 56 and 84, 90, via socket 122, plug 18, cable 20, plug 22, socket 30, internal wiring of junction box 24, socket 32, plug 58, cable 60, plug 62, socket 62′, and internal wiring of junction box 66. Terminal 106 is connected to the microphones 38 and 75 via socket 122, plug 18, cable 20, plug 22, socket 30, socket 31, plug 34, cable 36, socket 32, plug 58, cable 60, plug 62, socket 62′, socket 72′, plug 72 and cable 74.

By the arrangement described, when switch 99 is in position R with pole 102 at terminal 104, radio broadcast signals are fed to the earphones or speakers of both the driver and passenger of the motorcycle. When switch 99 is in position I with pole 102 at terminal 106, either the driver or passenger can speak in a normal tone and his throat microphone 38 or 75 will apply the audio signals to the transistor amplifier via the input capacitor 108. The spoken message will be heard at both pairs of earphones or speakers in the helmets 11 and 12. Switch 97 connected in series with battery 125 can be used to turn the receiver 14 on and off.

It will be apparent that the communication system described solves the problem of voice communication between a driver and passenger of a motorcycle in a simple, inexpensive, reliable manner. At any time the passenger or driver can dismount from the motorcycle and the quick disconnect plugs 58 or 62, or both, can be pulled out of their sockets. This will permit freedom of movement of the driver and/or passenger away from the motorcycle. On returning to the motorcycle the driver and/or passenger can reinsert plugs 58 and 62 in junction boxes 24, 66 to reestablish the alternate radio-intercommunication system between driver, passenger and radio receiver 14.

An important feature of the invention is the quick and easy way in which the microphones, speakers and junction boxes can be mounted by self-adhering means. The resilient pads serve as sound and shock absorbers and enable improved quiet audio reception.

What we claim is:

1. A communications system for two riders on a motorcycle, comprising a pair of helmets wearable by the respective riders; two pairs of earphones, each pair of earphones being mounted inside opposite walls of a different helmet; two junction boxes respectively mounted on exterior walls of the helmets, each junction box having a plurality of sockets connected to wiring inside the junction box; two throat microphones; spring clip means detachably mounting each microphone on a chin strap of a different helmet for direct contact with the throat of the rider; a waist belt for one rider; a radio receiver mounted on said belt for operation by said one rider; said radio receiver having a transistorized audio amplifier stage, said audio amplifier stage having input and output ends; switch means connected to the input end of said amplifier stage; other sockets at the radio receiver connected to the output end of the audio amplifier stage and to said switch means; wiring interconnecting each pair of earphones with the wiring inside a junction box on one of the helmets; first cable means connected between the throat microphones and a first two sockets at the respective junction boxes; second cable means connected between a second two sockets at the respective junction boxes; third cable means connected between the socket at the radio receiver and a third socket of one of the junction boxes at said one helmet, whereby the microphones can apply audio signals via said switch means to the audio amplifier stage, and whereby the earphones are connected in circuit with the output of the amplifier stage to reproduce amplified audio signals audibly; quick disconnect plugs at ends of said first, second and third cable means engageable in said first two sockets, said second two sockets, said third socket and the socket of the radio receiver; said switch means comprising a two-position switch, said radio receiver having a transistorized detector stage producing audio frequency radio broadcast signals, said switch being so arranged that in one position thereof it applies audio signals from the microphones to the input end of the audio amplifier stage, and in a second position thereof it applies audio frequency broadcast signals from the detector stage to the input end of the audio amplifier stage, whereby the earphones will selectively reproduce the audio signals from the microphones and the audio signals from the detector stage depending on the setting of said switch.

2. A communications system as defined by claim 1, wherein each of said junction boxes is attached to a resilient pad; adhesive means holding the pads to the exterior walls of the helmets; means attaching each of the earphones to a different other resilient pad; and other adhesive means holding the other pads on the inside walls of the helmets adjacent the junction boxes thereat for electrical connection with wiring therein.